United States Patent Office 3,025,133
Patented Mar. 13, 1962

3,025,133
METHOD FOR TREATING EXHAUST FROM AN INTERNAL COMBUSTION ENGINE OPERATED ON LEADED FUEL
Alfred J. Robinson, South Plainfield, Charles A. Specht, Englewood, and Charles G. Albert, Basking Ridge, N.J., assignors to Minerals & Chemicals Philipp Corporation, a corporation of Maryland
No Drawing. Filed Oct. 12, 1959, Ser. No. 845,611
3 Claims. (Cl. 23—2)

The present invention relates to an improved method and system for treating exhaust vapors from internal combustion engines using leaded fuel to eliminate harmful and malodorous components normally present in the engine exhaust and discharged into the atmosphere. The presence in the atmosphere of incomplete combustion products of fuel hydrocarbons has a potentially deleterious effect on comfort and health. In recent years the correlation between the presence of unburned fuel hydrocarbons in the atmosphere and the production of so-called "smog" conditions has been established with some certainty and smog irritants are believed to be the result of a gaseous phase photochemical reaction in which unburned fuel hydrocarbons and nitrogen oxides in the atmosphere are prime contributory factors. The composition of engine exhaust depends on engine type as well as load, speed, fuel burned in the engine, etc., and is generally characterized by the presence of vapor phase unburned fuel hydrocarbons, both saturated and unsaturated, as well as carbon monoxide and hydrogen. Partial oxidation products, such as organic acids, aldehydes and ketones may be present in exhaust from spark-ignited engines and typify material present in diesel exhaust. Also frequently present in engine exhaust are finely divided unburned carbonaceous solids.

The desirability of eliminating or reducing substantially the incomplete products of combustion normally present in exhaust from internal combustion engines, both of the spark-ignited and diesel types, is self-evident and a variety of remedial methods and apparatuses have been described in the patent literature.

One of the more promising approaches to the problem involves the use of a so-called "catalytic exhaust purifier," of which there are many varieties, all depending for their efficacy on contacting hot exhaust gases in the presence of air or oxidizing gas with an agent capable of catalytically oxidizing incomplete combustion products and/or carbon monoxide in exhaust gases into oxidized, preferably fully oxidized, innoxious materials such as carbon dioxide and water. In accordance with such methods, a supply of fresh air (usually referred to as "secondary air" to distinguish it from air blended with the fuel fed to the engine) is added to exhaust gases to be treated in the catalytic purifier or converter in amount to supply the oxygen required to render the exhaust gases innoxious.

The preferred temperature for catalytic purification of engine exhaust by catalytic oxidation varies with factors such as concentration of oxidizable components in the fumes and is generally from about 700° F. to 1300° F. and more usually about 900° F. to 1100° F., or temperatures which are above the threshold temperature of catalyst activity but below that at which the catalyst is destroyed or otherwise undergoes loss of activity.

The recent widespread use of so-called "leaded gasolines" has placed a serious limitation on possible benefits realized by use of catalytic exhaust purifiers. Leaded gasolines are those to which has been added a small quantity of an organic lead compound, usually tetraethyllead, for the purpose of increasing the octane rating of the fuel. Invariably a halogenated compound, usually a mixture of ethylene dibromide and ethylene dichloride, is added with the lead compound to convert lead oxides into the more volatile lead halides so as to inhibit lead deposition on the cylinder walls.

At normal temperature exhausted lead is in the form of small particles, usually from 0.01 micron to several millimeters in diameter, and is reported to be composed mainly of $Pb.Cl.Br$, forms of $NH_4Cl.2Pb.Cl.Br$ and other ammonium-lead-halides. Frequently fuels contain phosphorus compounds and the lead present in exhaust from such leaded fuels is said to contain a major proportion of lead halides and a minor although significant quantity of complex lead-phosphate-halide compounds. Lead halides have an appreciable vapor pressure during the phases of engine operation at which the exhaust is at elevated temperature. When a catalytic exhaust purifier is adapted to an engine operated on leaded fuel, the lead compounds in the engine exhaust tend to deposit and accumulate on the catalyst bed and impair the catalytic activity of the cataylst. Although certain catalysts, such as an alumina supported vanadium pentoxide catalyst, have been reported to be more resistant to lead poisoning than other oxidation catalysts heretofore suggested for use in catalytic exhaust purifiers, even such a catalyst has a limited span of utility before it operates well below optimum activity. Moreover, the presence of a finely divided suspension of lead compounds in the atmosphere is believed to be injurious to health and much of the lead compounds which are not tied up by the oxidation catalyst are vented into the atmosphere. While mechanical methods for removing suspended lead-containing particles from exhaust might appear to offer a simple solution to the problem, in practice such procedure is impractical because of the very fine particle size of the lead compounds. Furthermore, when exhaust temperature is high a portion of the lead compounds are in the vapor phase and are thus not amenable to sedimentation or similar methods.

It is an object of the present invention to obviate the aforementioned difficulties.

A more specific object of the invention is the provision of a simple means for enhancing the efficacy of an oxidation catalyst in a catalytic exhaust purifier adapted to an internal combustion engine operated on leaded fuel.

Further objects and features will be readily apparent from the following description thereof.

We have discovered, in connection with the purification of lead containing exhaust vapors from an internal combustion engine by catalytic oxidation of unburned fuel hydrocarbons therein that important benefits are realized when such vapors are contacted with a "lead trap" solid contact mass of a character hereafter set forth prior to their catalytic conversion by contact with an oxidation catalyst, in a manner hereafter set forth.

Stated briefly, the method of our invention involves the purification of raw (unoxidized) engine exhaust which contains unburned fuel hydrocarbons, carbon monoxide, frequently partial oxidation products of hydrocarbons, and lead compounds, principally lead compounds, especially lead halides, lead-ammonium-halide complexes (and lead-halide-phosphate complexes or other lead salt complexes in some instances). In accordance with our invention, such raw exhaust is continuously contacted during all phases of engine operation with a solid material which when contacted with lead salt compounds in the exhaust will cause such compounds to be converted by chemical means into lead-bearing materials of very low volatility even at the most elevated temperatures which engine exhaust reaches so that the concentration of lead compounds in the exhaust contacting the oxidation catalyst is appreciably reduced. In the case that the exhaust fumes are cool, the lead trap will retain all but the most volatile lead-containing materials in the exhaust and as the temperature increases these compounds will be chemically converted and retained in the lead trap. Preferably the novel solid treating agent comprises an active lead-converting substance carried or supported by a hard porous solid adsorbent material so that the agent may function also to sorb some unburned fuel hydrocarbons in engine exhaust when the engine exhaust is at a temperature below the threshold activation temperature of the oxidation catalyst. The seondary air is preferably supplied to the exhaust stream subsequent to its passage through the lead-converting agent so as to maintain the concentration of lead components in the exhaust at a maximum when such components are contacted with "lead trap." Lead compound conversion will be more effective when the concentration of lead compounds in the exhaust is high. The mixture of air and lead-depleted exhaust is then contacted with the oxidation catalyst and passed into the atmosphere.

By treating impure engine exhaust in such a manner, it is apparent that loss of activity of the oxidation catalyst which would normally occur as a result of contamination of the catalyst by lead compounds is minimized. Such a result is in distinct contrast with those realized using catalytic exhaust purification systems of the prior art wherein the catalyst requires frequent replacement or periodic chemical regeneration as a result of lead contamination.

When the lead-converting solid is one comprising a sorptive support for the active lead-converting material, the adsorbent support may also sorb vapor phase unburned fuel hydrocarbons when the engine operates to produce relatively low temperature exhaust, as during warmup from a cold start, idling and, frequently, deceleration. On the other hand, when the engine operates under full load or high speed or otherwise produces hot exhaust at or above the threshold activation temperature of the catalyst, the stream of hot exhaust contacting the adsorbent support desorbs the sorbed components of exhaust feed previously contacted with the adsorbent, thereby purging and regenerating the adsorbent in situ. The desorbed components are then carried into contact with the oxidation catalyst by the stream of hot exhaust issuing from the engine and the latter pass through the adsorbent with minimal sorption of components at the high temperature of the exhaust under such conditions. The combustibles from both sources undergo vapor phase destruction on contact with the oxidation catalyst in the presence of an adequate supply of oxygen. By treating impure engine exhaust in such a manner, it is apparent that during all phases of engine operation the exhaust issuing into the atmosphere from the engine will be converted to purified condition. In prior art catalytic exhaust purification systems the exhaust is not oxidized by the oxidation catalyst at low temperatures below the threshold activation temperature of the catalyst.

The preferred system for accomplishing the purification of the leaded exhaust in accordance with the method of the invention involves an arrangement of a plurality of vapor permeable cartridges, each cartridge made up of a foraminous or perforated casing and containing particles of lead-converting solid, the cartridges being aligned in side-by-side spaced relationship and arranged serially in the order mentioned. Each cartridge with its contents is preferably supplied as a sealed unit so that when the activity of the contents of the cartridge is exhausted, the cartridge may be removed from and replaced in the shell housing the cartridges without disturbing or replacing the other cartridges or cartridges which contain active exhaust treating substances. The particles of active exhaust treating solid are larger than the perforations in the cartridge housing the particles. The casing is perforated to provide for uniform vapor flow into the cartridge. Means are provided for introducing raw exhaust first into the cartridge containing the lead-converting solid and for withdrawing exhaust therefrom and into contact with the cartridge containing oxidation catalyst particles. Air inlet means, such as a venturi inspirator, is provided in the means communicating the lead-converting cartridge with the catalyst cartridge to mix the exhaust effluent from the lead-converting chamber with fresh air. The catalyst chamber is provided with outlet means for exhausting vapor effluent from the catalyst cartridge into the atmosphere. If desired, the particles of lead-converting solid and catalyst may be mixed and housed in the same cartridge provided the temperature at which the lead-converting solid operates is lower than the temperature at which lead compounds have a deleterious effect on the catalyst. The cartridges are housed in a shell which is assembled and constructed in a manner such that the assembly doubles as an acoustic muffler which may be used in place of a conventional acoustic muffler.

More specifically, in accordance with the present invention, we may employ any oxidation catalyst which is susceptible to loss of catalytic activity when exposed to lead compounds in engine exhaust. Loss of activity may be caused by one or more of the following factors: fusion of lead compounds on the catalyst surface; reaction of lead compounds with active catalytic material to form an inactive lead complex, such as, for example, the complex lead vanadates formed by reaction of lead compounds with a vanadium pentoxide catalyst.

The catalyst is one which is capable, in the presence of an adequate supply of oxygen, of oxidizing completely the unburned hydrocarbons in exhaust fumes (as well as the carbon monoxide, if carbon monoxide elimination is also desired) at a temperature at which hydrocarbons are effectively desorbed from the adsorbent. Such a catalyst must also be stable at the maximum exhaust temperature anticipated to be encountered in the system. Among the most promising catalysts, particularly when the exhaust of leaded fuel is treated, is the vanadia-alumina catalyst which is described in detail in a paper entitled "The Application of Vanadia-Alumina Catalysts for the Oxidation of Exhaust Hydrocarbons," by W. A. Cannon and C. E. Welling, presented at the SAE Annual Meeting, January 12–16, 1959, and copies of which are available from the Society of Automotive Engineers. Also useful is a platinum catalyst prepared, for example, by impregnation of activated alumina with about 0.4% platinum. Other metal or metal oxide catalyst, such as copper oxide catalysts, supported or nonsupported, may be used and catalyst may be used singly or in any suitable combination.

The catalyst we employ is in the form of particles which may be as coarse as 4/8-mesh or as fine as 60/100-mesh. However, particles coarses or finer may be used. The catalyst particles are preferably substantially uniformly sized and of smooth or regular contour, such as cylindrical pellets, spheres or spheroids, so as to provide for uniform pressure drop throughout the bed of catalyst particles. The catalyst particles preferably substantially fill their housing so as to prevent channeling or by-passing of vapor. However, they are not tightly packed inasmuch as tightly packed catalyst particles may be more prone to crushing when subjected to mechanical and/or thermal shock.

It will be distinctly understood that the oxidation catalyst may be used in other than the bed form above-described. For example, the catalyst may take the form of rigid structural members, such as rods, which are arranged in rows, typically in staggered relation. The rods or the like may consist of a rigid base material, such as porcelain, upon which is impregnated a film of finely divided catalytically active metal, such as platinum.

The invention, in its broadest aspect, is intended to encompass as the "lead trap" agent any solid material which will reduce the concentration of lead compounds in the exhaust by converting said lead compounds into lead-bearing material of very low volatility as by reacting with the lead compounds to form lead salt complexes of low volatility; by converting the lead halide salts of high vapor pressure into the lead oxide which has a much lower vapor pressure; by reducing the lead salt into metallic lead or by any combination of the aforementioned functions. Elevated temperature is required to effect the desired conversion. Inasmuch as the "lead trap," in accordance with our invention, contacts the vapors almost immediately after their emission from the engine, prior to dilution of the vapors with secondary air, etc., they reach temperatures of the order of 350° F. or more in short time. Several classes of material are suitable for use in the "lead trap." As mentioned, the "lead trap" material preferably comprises active lead-converting material mixed with or carried on the surface of a hard adsorptive microporous support material since such material may also function to prevent passage of unburned fuel hydrocarbons into the atmosphere when exhaust is below the threshold temperature of the catalyst. Diatomaceous earth, activated aluminas of natural or synthetic origin, and various microporous aluminosilicates of natural or synthetic origin, such as heat or acid-activated clays, exemplify such adsorptive support material.

One class of suitable lead-converting solids may be broadly described as thermally stable solids which contain a reactable phosphate constituent. A preferred specie is an aluminum silicate phosphate complex which may be prepared, for example, by mixing kaolin clay with a mixture of concentrated sulfuric acid (e.g., about 90% concentration) and 85% orthophosphoric acid, using the phosphoric acid in amount of from about 5 to about 95% by weight of the total acid, 100% acid basis. The total acid employed will be sufficient to form an extrudable mixture with the clay and is typically a 60% to about a 200% dosage. "Acid dosage" is defined as the weight of 100% acid per unit part by weight of clay, expressed on a percentage basis. The mixture is extruded to form pellets, the pellets aged to permit reaction between the aluminum of the clay and the acid, and without leaching water-soluble aluminum salts, the reaction product is thermally desulfated at temperatures of the order of about 900° F. to about 1600° F., depending on the atmosphere in which the desulfation is carried out.

The general procedure for preparing the pellets is described in a copending U.S. Patent application of Serial No. 490,128, filed February 23, 1955, now Patent No. 2,967,157, of which Alfred J. Robinson, a coinventor of the present invention, is an inventor. The procedure of the patent is modified by the use of phosphoric acid together with sulfuric acid taught in the patent. Alternatively, the sulfuric acid-reacted, thermally desulfated kaolin clay produced in accordance with he teachings of the aforementioned patent application may be impregnated with a small quantity of phosphoric acid, e.g., from about 3% to 15% by weight of 85% phosphoric acid, and heated to elevated temperature up to about 1500° F. The advantage of using the desulfated kaolin clay product in these various modifications is that the product is thermally stable at elevated temperatures as high as 1500° F. or more and is highly resistant to attrition. However, other aluminosilicates, of natural or synthetic origin and which have been reacted with phosphoric acid may be used provided such products are sufficiently resistant to attrition and fusion. The reactable phosphate is thought to bind the lead in engine exhaust by forming lead-phosphate halide complexes which have lower volatility than the lead halides in the exhaust.

Still another class of materials we may employ to remove the lead from the exhaust stream includes molybdenum and tungsten oxides as well as molybdenum metal or tungsten metal supported catalyst. The support may be any microporous, thermally stable, attrition-resistant solid, usually silica, aluminum or aluminosilicate such as, for example, pumice or the sulfuric acid-reacted thermally desulfated kaolin clay of the aforementioned copending patent application. The support should be as inexpensive as possible and good results may be realized using an inexpensive support which is unsuitable as a support for the oxidation catalyst. It is thought that these metals remove lead from the exhaust stream by forming lead-tungstate or lead molybdenate complexes of low vapor pressure. The supported molybdenum or tungsten particles are in the form of granules, preferably in the form of cylindrical pellets or spheres. The size of the granules is within the range set forth above as being suitable for oxidation catalyst particles.

Still another material we may employ in the "lead trap" is metallic iron or steel in a form which presents a large exposed surface, e.g., nails, borings, steel wool. It is reasonable to expect that tin or zinc metal, alloys, thereof or with iron, may also be useful. Preferably the iron is in the form of granules of finely divided particles of metallic iron supported on a silica, alumina or aluminum silicate carrier, e.g., pellets of the sulfuric acid reacted, thermally desulfated kaolin clay of the aforementioned copending patent application of Alfred J. Robinson et al. Such pellets may be made, for example, by impregnating the acid-activated kaolin clay or other suitable sorptive carrier with an aqueous solution of iron nitrate, thermally decomposing the nitrate into an iron oxide and heating the composition in a reducing atmosphere to decompose the iron oxide into metallic iron. Suggested portions of iron in the composition is from about 1 to 10%, based on the weight of the carrier. The particle size range of the active material in the lead trap is similar to that of the catalyst and similar considerations apply to the selection of granules of optimum particle size.

More particularly a preferred embodiment of the system of our invention which is suitable for attachment to the exhaust outlet of an internal combustion engine consists of a cylindrical shell provided with an inlet conduit at an end thereof which is adapted for open communication with the exhaust outlet of an internal combustion engine. An outlet at the opposing end of the shell is in open communication with the atomsphere. Within the shell is a framework adapted to secure in detachable fashion a battery of at least two cartridges. Each cartridge and its contents is adapted to be inserted in and removed from the shell as a unit and the shell is provided with a removable partition for the purpose. Each cartridge consists of a perforate thin gauge steel casing. One cartridge is filled with spheres of an aluminum-phosphate-silicate complex which is prepared by impregnating "Kaospheres" with 10% by weight of 85% orthophosphoric acid, and then calcining the impregnated product at 1000° F. for an hour. "Kaosphere" is the trade name of an acid-activated kaolin clay in spherical form; the product is processed and supplied by Minerals & Chemicals Corporation of America and analyzes about 45% by weight $Al_2O_5$ and the balance essentially $SiO_2$. The other cartridge is filled with pellets of an alumina supported vanadium pentoxide catalyst containing 10.0% by weight of vanadium pentoxide. The cartridges are aligned in side-by-side relationship and spaced from one another in the central portion of the shell, with the cartridge containing the phosphate material being proximate the end of the shell which contains the inlet for receiving the exhaust from the engine and the cartridge containing the catalyst positioned near the opposing end of the shell. Conduit means are provided for passing exhaust from the inlet of the shell into direct contact with the first cartridge containing the lead-converting substance. Another conduit is provided for passing exhaust effluent from the cartridge containing lead-converting material into the second cartridge containing pellets of oxidation catalyst and a third conduit is provided for passing exhaust contacted with the oxidation catalyst pellets into the exhaust outlet means provided at an end of the shell. Fresh air inlet means, such as a venturi inspirator, is in open communication with the conduit communicating the lead-converting cartridge and the catalyst cartridge whereby vapors contacted with the lead-converting substance are diluted with fresh air to supply the oxygen required for oxidation of the unburned fuel hydrocarbons and carbon monoxide in the catalyst chamber. Although such a construction of cartridge and shell is suitable for the purposes of the present invention, it will be distinctly understood that other constructions, including those not including replaceable cartridges, and as are know or as will readily suggest themselves to those skilled in the art, may be used.

Many variations in the system above-described are within the scope of our invention and encompassed by the appended claims. The catalytic element of the system may comprise a plurality of catalytic zones, with catalysts of differing or same activity or composition in the various zones. Similarly a plurality of lead-converting zones may be provided, with materials of the same or different composition in the various zones.

If desired, a baffle chamber may be included in the system of the invention. Also, provision may be made for cooling the lead trap as well as for limited cooling (in addition to that due to the secondary air) of the catalyst cartridges to hold the catalyst to a temperature at which it is stable. If desired, an afterburner may be provided in the system to burn nitrogen-containing matter in the catalyst-contacted exhaust.

To maintain the temperature of the catalyst at the desired temperature, the orifice of the inlet air at the venturi system or at the outlet of the catalyst chamber may be controlled or both may be controlled.

Obviously, specific details of the purification system and method of our invention will vary with the engine size and type, space available for the purifier, available materials of construction and nature of the various solid contact masses employed.

While the method and system of our invention have been disclosed in what is presently believed to be its preferred forms, it will be understood that the invention is not restricted to the specific details set forth above but encompasses changes, modifications and adaptations falling within the scope of the appended claims.

We claim:

1. A method of treating exhaust vapors from an internal combustion engine operated on leaded fuel to remove undesirable contituents from said vapors which comprises contacting exhaust vapors containing lead salt compounds and noxious oxidizable compounds with granules of an aluminosilicate which had previously been reacted with phosphoric acid, thereby to convert said lead compounds into lead-bearing materials of low volatility, then contacting said exhaust vapors with an oxidation catalyst in the presence of a quantity of oxygen sufficient to oxidize noxious oxidizable components thereof, said catalyst being one that is susceptible to loss of catalytic activity in the presence of lead compounds, and passing vapors thus treated into the atmosphere.

2. A method of treating exhaust vapors from an internal combustion engine operated on leaded fuel to remove undesirable constituents from said vapors which comprises contacting exhaust vapors containing lead salt compounds and noxious oxidizable compounds with attrition-resistant granules of acid-activated kaolin clay which had been reacted with phosphoric acid thereby to convert said lead salt compounds into lead-bearing material of low volatility, mixing the exhaust vapors thus treated with a quantity of air sufficient to supply at least the amount of oxygen required for oxidation of said noxious oxidizable compounds, contacting the air-exhaust mixture with an oxidation catalyst which is susceptible to loss of catalytic activity when contacted with lead compounds originally in said exhaust and passing the exhaust vapors thus treated into the atmosphere.

3. A method of treating exhaust vapors from an internal combustion engine operated on leaded fuel to remove undesirable constituents from said vapors which comprises contacting exhaust vapors containing lead salt compounds and noxious oxidizable compounds with granules of kaolin clay which had previously been reacted with a mixture of sulfuric acid and phosphoric acid and thereafter were thermally desulfated at elevated temperature, thereby to convert said lead compounds into lead-bearing materials of low volatility, then contacting said exhaust vapors with an oxidation catalyst in the presence of a quantity of oxygen sufficient to oxidize noxious oxidizable components therein, said catalyst being one that is susceptible to loss of catalytic activity in the presence of lead compounds, whereby lead compounds are removed from said exhaust vapor prior to contact of said vapor with said oxidation catalyst, and passing vapors thus treated into the atmosphere.

References Cited in the file of this patent

UNITED STATES PATENTS

| | | |
|---|---|---|
| 1,402,814 | Wachtel | Jan. 10, 1922 |
| 2,882,243 | Milton | Apr. 14, 1959 |
| 2,912,300 | Cannon et al. | Nov. 10, 1959 |
| 2,942,932 | Elliott | June 28, 1960 |

OTHER REFERENCES

Mellor: "A Comprehensive Treatise on Inorganic and Theoretical Chemistry," Longmans, Green and Co., N.Y., vol. 7, 1927, page 718.